May 15, 1956     J. V. FITZGERALD ET AL     2,745,284
GLASS RADIOMETER
Filed Feb. 20, 1952
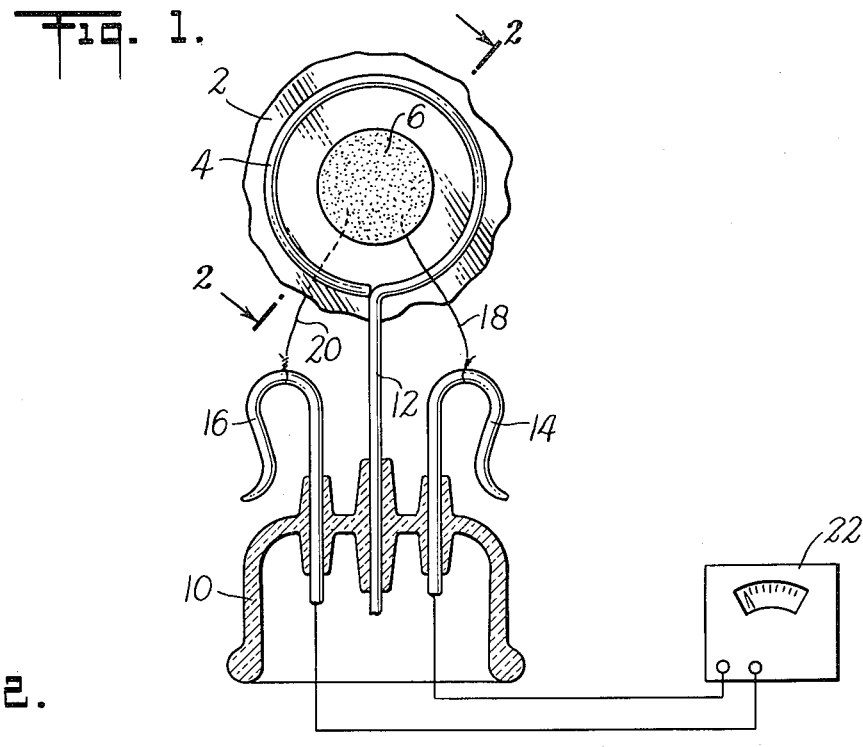
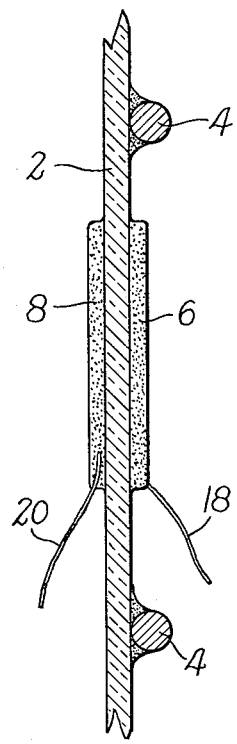
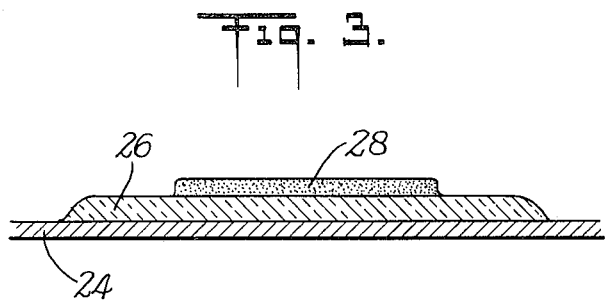
INVENTORS
John V. Fitzgerald
Kenneth M. Laing
BY
Oscar L. Spencer
ATTORNEY United States Patent Office 2,745,284
Patented May 15, 1956

2,745,284

GLASS RADIOMETER

John V. Fitzgerald and Kenneth M. Laing, New Kensington, Pa., assignors to Pittsburgh Plate Glass Company Application February 20, 1952, Serial No. 272,674

8 Claims. (Cl. 73—355)

This invention relates to transducers and more particularly to variable resistance devices using thin films of glass as the condition-responsive elements. Devices of this type, which are small, economical, and easily constructed, are particularly useful in control and measurement systems responsive to changes in pressure, temperature, radiation, etc.

In a preferred embodiment of the invention, opposite surfaces of a thin film of glass are coated with electrically conductive material to form contact electrodes. These electrodes are connected to apparatus responsive to changes in resistance between the electrodes, that is, to changes in the electrical resistance of the glass film.

The resistance of such a glass film varies with its temperature so that an ohmmeter circuit connected to the electrodes forms a sensitive thermometer that responds rapidly to small changes in the ambient temperature.

The device can also be used as a detector of radiant energy. The energy falling upon one or both of the electrodes is converted into heat which warms the glass film and changes its resistance. Used in this manner, the device can readily detect energy radiated from the palm of the hand.

Moreover, the resistance of the glass film varies with adiabatic changes in pressure and the device thus finds utility as a microphone or a transducer in sonar or ground-shock detecting systems.

Moreover, because the glass film is very thin, usually substantially less than one ten-thousandth of an inch, it is capable of responding rapidly to changes in ambient temperature, radiation, or pressure.

Moreover, the resistance of the glass film is relatively high so that it can be coupled efficiently directly to electron tubes any need for expensive impedance-matching transformers.

These and other aspects, objects, and advantages of the invention will be in part apparent from and in part pointed out in the following description of a preferred embodiment of the invention considered in conjunction with the accompanying drawing, in which:

Figure 1 is an elevational view of a radiometer embodying the invention;

Figure 2 is a sectional view taken along line 22 of Figure 1; and

Figure 3 is a sectional view of another embodiment of the invention.

In Figures 2 and 3, the thicknesses of the electrodes and the glass film have been increased without regard to proportions to illustrate the construction more clearly.

A thin glass film 2 is formed most conveniently by blowing a ball of fused glass into a large bubble and breaking away a portion of the thin wall which preferably has relatively uniform thickness and, for most uses, is nearly planar. This glass film may have a diameter of two inches more or less and a thickness of the order of $10^{-4}$ cm. It is usually desirable that the glass be less than $10^{-2}$ cm. in thickness or the resistance of the instrument is so high as to render it difficult to use. The preferred thickness is about $10^{-4}$ cm. although this depends upon the particular use, the resistivity of the glass composition, the size of the electrodes, etc.

In order to support this thin film 2, it may be secured to a wire frame or ring 4, by a nitrocellulose base cement or other suitable adhesive, so as to cover the opening in the ring 4. Conveniently, the ring 4 may be from one to one and one-half inches in diameter.

In order to permit the measurement of the electrical resistance of this film, electrodes 6 and 8 are deposited on opposite sides of the glass. These electrodes may be, for example, about two centimeters in diameter and can be formed of graphite, applied in the form of a colloidal dispersion in water or other volatile agent. The preparation known as Aquadag is suitable for this purpose. For most applications, each of the electrodes will be at least one square centimeter in area, in order to provide sufficiently low resistance to permit easy measurement.

Other forms of electrodes can be used. For example, metal electrodes applied by evaporation, thermal reduction, or sputtering can be used. Conductive organic materials or conductive oxides of tin, indium, cadmium, or other metals can be used.

For certain applications, it is desirable to provide an insulating support for the ring 4. As shown in Figure 1, the ring 4 is supported by a cup-shaped glass base 10 to which the ring 4 is secured by means of a vertical stem 12. This base 10 also provides rigid insulating support for two supporting wires 14 and 16 to which the leads 18 and 20 from the electrodes 6 and 8, respectively, are secured. These leads 18 and 20 are formed of very small soft wire so as not to exert any undesirable stress on the thin glass film 2. These leads may be formed of aluminum wire having a diameter of about $10^{-3}$ cm. such as is used in photoflash bulbs. The leads can be cemented to the electrodes by conductive paint, or by cold soldering, or they may be immersed in the wet Aquadag film when the electrodes are formed.

A small change in the temperature of the glass film 2 causes a relatively large change in its resistance. This resistance can be measured by a conventional ohmmeter or bridge 22 connected to the electrodes 6 and 8.

The resistance of the device depends upon the composition of the glass and upon the extent to which the glass has been annealed, upon the thickness of the glass film, and upon the area of the electrodes.

The resistance of the device may readily be made less than one megohm so that the resistance can be measured readily by conventional ohmmeters. For some applications, it is desirable that the resistance between the electrodes be substantially higher, for example, of the order of $10^9$ ohms.

With a glass composition having a resistivity of $4 \times 10^{13}$ ohm—cm., an increase in temperature of one degree (at 22° C.) of the glass film decreased the resistance of the device by eight percent. Glass bolometers can be made with a wide range of sensitivities. In general, the larger the activation energy of the glass for electrical conduction as a function of temperature, the more sensitive the bolometer will be.

Silver borate glasses generally have low activation energy, whereas glasses high in lead silicate have high activation energy. Thus, one silver borate glass was found to have an activation energy of 12,000 calories per mole, a sodium silicate glass to have an activation energy of 14,000 calories per mole, and a lead silicate glass to have an activation energy of 56,000 calories per mole.

Sodium silicate glass can be used to make a bolometer having a resistance of less than one megohm and a sensitivity of —5% per degree C. at 22° C. Substantially lower resistances can be obtained using silver borate glasses.

The size of the glass film 2 obviously depends upon the requirements of a particular application. However, surface leakage, which is substantially affected by humidity and the presence of soluble salts on the glass surface, should not be overlooked in the design. Thus, with thick glass members, it is difficult to measure the resistance of glass, unless troublesome special precautions are taken, because of the errors introduced by surface leakage. Thus, in the present device it is desirable that the glass diaphragm 2 extend a substantial distance beyond the electrodes so that the surface path between the electrodes is long and offers a high resistance relative to the resistance of the path through the glass. In a practical instrument, it is important that the length of the shortest path between the electrodes over the surface of he glass be at least one thousand times the length of the shortest path between the electrodes through the glass. Advantageously, this ratio should be much higher and these higher ratios are attainable readily. Thus, assume a circular glass diaphragm four centimeters in diameter and $10^{-4}$ centimeters in thickness. If circular graphite electrodes two centimeters in diameter are painted on the surfaces of the glass so that the glass extends at all points one centimeter beyond the electrodes, then the shortest surface path between the electrodes is two centimeters and the shortest path through the glass is $10^{-4}$ cm., a ratio of twenty thousand. With such construction, the instrument will not be affected significantly by changes in humidity. Obviously, the surface-path conductivity that can be tolerated depends upon the particular application, the resistivity and thickness of the glass diaphragm, and the accuracy desired.

The device can be made somewhat smaller by replacing the wire ring with suitable high resistance insulating material, for example, polystyrene or polyethylene.

Instead of preparing the thin glass film and applying the electrodes to it, the glass film may be formed by using a glass frit fired directly on a metal electrode. Figure 3 represents a quick-response bolometer comprising a platinum sheet-electrode 24, a glass film 26, and a graphite electrode 28. This particular bolometer was constructed by suspending 200 mesh powdered plate glass dispersed in a volatile essential oil and applying the mixture to the platinum electrode 24. The film was then dried and fired to form the thin glass layer 26 on the platinum electrode 24. The electrode 28, of graphite or other material, was then applied as described previously.

The metal electrode serves as a thermal sink and determines the dissipation constant of the bolometer. This sink is necessary to obtain fast response to fluctuating thermal radiation. It is sometimes advantageous to have the sink in intimate or fused contact with the glass in order to achieve ultimate speed in responsive time. Metal thermocouples, bolometers, and thermistors are limited in responsive time because they must be electrically insulated from metal sinks and this necessarily involves some heat insulation.

The composition of the glass to be employed will depend not only upon the desired electrical characteristics but also upon the end use. For example, if it is desired that the instrument respond selectively to visible light, a black glass containing chromium and manganese oxides can be used. This glass will absorb visible light but transmit infrared light. The electrodes should be formed of conductive material that is transparent to both infrared and visible light, such as tin oxide or one of the electrically conductive plastics transparent to these wavelengths.

In order to measure high energy radiation such as gamma, beta, and X-rays, lead or other heavy metal glasses which are relatively opaque to such radiation can be used. Many of the lead glasses are particularly temperature sensitive and are well suited for applications of this type.

A neutron responsive glass bolometer can be made by using glass compositions containing boron, cadmium, silver or other elements for which the probability of capturing neutrons is very high. Boron and cadmium, for example, are respectively 9500 and 3300 times more neutron absorbent than silicon. The neutron responsive bolometer can be used in connection with the control and operation of neutron reactive systems, such as atomic piles or atomic weapons. If desirable the specially selected elements, boron and cadmium, or in the case of gamma radiation, lead, may be incorporated in the electrode rather than in the glass resistive element of the bolometer.

If the glass diaphragm herein is subjected to adiabatic changes in air pressure, its electrical resistance changes. The device therefore can be used as a microphone, vibration detector, sonar receiving element, and the like.

From the foregoing, it is apparent that the transducer embodying our invention is well adapted to attain the ends and objects hereinbefore set forth, and that it can be modified readily in a variety of ways so as to best suit the needs of each particular use.

We claim:

1. A condition-sensitive element comprising a glass diaphragm, electrodes in electrical contact with opposite sides of said diaphragm near its center with the edge portions of said diaphragm extending at least 1 cm. beyond the limits of said electrodes, a supporting element having an opening therein, said supporting element engaging said extending edge portions of the glass diaphragm with the inner edge of said opening spaced from said electrodes, the thickness of the glass of said diaphragm between said electrodes being of the order of $10^{-4}$ cm., and resistance responsive means connected to said electrodes.

2. Apparatus as claimed in claim 1 wherein one of said electrodes is formed of a thin layer of metal having good heat conductivity in intimate contact with said glass film thereby providing a thermal sink, whereby the dissipation constant of said apparatus is raised to provide rapid response to absorbed radiation.

3. Apparatus as claimed in claim 1 wherein at least one of said electrodes is formed of conductive material transparent to visible light, whereby said light is enabled to reach said glass member.

4. Apparatus as claimed in claim 1 wherein said glass is opaque to visible light and transparent to infrared light and said electrodes are transparent to both visible and infrared light, whereby infrared light passes through said apparatus without being significantly absorbed, but visible light is absorbed by said glass member.

5. Apparatus as claimed in claim 1 wherein said glass is transparent to visible light and opaque to ultraviolet light and said electrodes are transparent to both visible and ultraviolet light, whereby visible light passes through said apparatus without being significantly absorbed, but ultraviolet light is absorbed by said glass member.

6. A radiometer comprising a substantially uniformly thin substantially planar sheet of glass having a thickness of the order of $10^{-4}$ cm., a frame member having an opening mechanically supporting said sheet of glass stretched across said opening, first and second electrically conductive electrodes positioned on opposite sides of and in intimate contact with the respective surfaces of said glass within said opening, flexible wire leads connected to said electrodes, and resistance measuring means connected to said wire leads and arranged to measure the resistance of said glass between said electrodes.

7. Apparatus as claimed in claim 6 wherein each of said electrodes has an area of at least one square centimeter and the sheet of glass extends at least one-half centimeter beyond the outermost edge of at least one of the electrodes.

8. A condition-sensitive element as claimed in claim 1 and being selectively responsive to visible light and wherein said glass diaphragm is black and said electrodes are thin and substantially flat, said electrodes including tin oxide and being transparent to both visible and infrared light.

References Cited in the file of this patent

UNITED STATES PATENTS

| | | |
|---|---|---|
| 2,081,041 | Kott | May 18, 1937 |
| 2,120,099 | Iams | June 7, 1938 |
| 2,537,388 | Wooldridge | Jan. 9, 1951 |

FOREIGN PATENTS

| | | |
|---|---|---|
| 232,676 | Germany | Mar. 20, 1911 |

OTHER REFERENCES

Journal of the Optical Society of America, Moon et al., May 1938, vol. 28, pp. 148–162.

Journal of Scientific Instruments, vol. 24, #3, Ewles, March 1947, pp. 57–61.

Yamashita: Proceedings of the Physical Society of Japan, vol. 5, No. 2, 1950, pp. 93 and 94.